United States Patent
Du et al.

(10) Patent No.: US 11,746,020 B2
(45) Date of Patent: Sep. 5, 2023

(54) SULFUR-DOPED POROUS CARBON DERIVED FROM HEAVY HYDROCARBONS AND METHODS FOR PRODUCTION THEREOF

(71) Applicant: ExxonMobil Technology and Engineering Company, Annandale, NJ (US)

(72) Inventors: Yi Du, Coopersburg, PA (US); Bradley D. Wooler, Allentown, PA (US); Stuart E. Smith, Easton, PA (US); Brenda A. Raich, Annandale, NJ (US); Clarence Chase, Bensalem, PA (US); Lesheng Wang, Greenbrook, NJ (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 549 days.

(21) Appl. No.: 16/751,945

(22) Filed: Jan. 24, 2020

(65) Prior Publication Data
US 2020/0299141 A1     Sep. 24, 2020

Related U.S. Application Data

(60) Provisional application No. 62/820,982, filed on Mar. 20, 2019.

(51) Int. Cl.
*C01B 32/33* (2017.01)
*C01B 32/354* (2017.01)

(52) U.S. Cl.
CPC ............ *C01B 32/354* (2017.08); *C01B 32/33* (2017.08); *C01B 2210/0051* (2013.01); *C01P 2006/12* (2013.01)

(58) Field of Classification Search
CPC ...................................................... C01B 32/33
See application file for complete search history.

(56) References Cited

U.S. PATENT DOCUMENTS

| | | | |
|---|---|---|---|
| 4,265,768 A * | 5/1981 | Beasley | B01J 41/18 521/29 |
| 8,709,233 B2 | 4/2014 | McCoy et al. | |

OTHER PUBLICATIONS

J.J. Griebel, et al., "Preparation of Dynamic Covalent Polymers via Inverse Vulcanization of Elemental Sulfur," ACS Macro Lett., 2014, pp. 1258-1261, 3.

(Continued)

*Primary Examiner* — Stuart L Hendrickson
(74) *Attorney, Agent, or Firm* — Shook, Hardy & Bacon L.L.P.

(57) ABSTRACT

Sulfur-crosslinked olefins, particularly sulfur-crosslinked heavy hydrocarbon products having one or more sulfur-crosslinked olefin moieties, may undergo pyrolysis to form sulfur-doped porous carbon having high BET surface area values. Pyrolysis to form the sulfur-doped porous carbon may be particularly efficacious in the presence of a hydroxide base. BET surface areas up to 2000 $m^2/g$ or even higher may be obtained. Such sulfur-doped porous carbon may be prepared by combining a heavy hydrocarbon product with sulfur, heating to a first temperature state to form a liquefied reaction mixture containing a sulfur-crosslinked heavy hydrocarbon, homogeneously mixing a hydroxide base with the liquefied reaction mixture, and pyrolyzing the sulfur-crosslinked heavy hydrocarbon to form sulfur-doped porous carbon.

15 Claims, 7 Drawing Sheets

(56) References Cited

OTHER PUBLICATIONS

W.J. Chung, et al., "The use of elemental sulfur as an alternative feedstock for polymeric materials," Nature Chemistry, 2013, pp. 518-524, 5.

J. Lim, et al,. "A one-pot synthesis of polysulfane-bearing block copolymer nanoparticles with tunable size and refractive index," Chem. Comm., 2016, pp. 2485-2488, 52.

J. Lim, et al, "High sulfur content polymer nanoparticles obtained from interfacial polymerization of sodium polysulfide and 1,2,3-trichloropropane in water," Macromolecular Rapid Communications, 2015, pp. 1103-1107, 36.

J. Lim, et al, "Recent Approaches for the Direct Use of Elemental Sulfur in the Synthesis and Processing of Advanced Materials," Angew. Chem. Int. Ed. Engl., 2015, pp. 3249-3258, 54.

J.-S.M. Lee, et al., "High surface area sulfur-doped microporous carbons from Inverse vulcanised polymers," J. Mater. Chem. A, 2017, pp. 18603-18609, 5.

J.C. Bear, et al, "Porous carbons from inverse vulcanized polymers," Microporous and Mesoporous Materials, 2016, pp. 189-195, 232.

D.J. Parker, et al., "Low cost and renewable sulfur-polymers by inverse vulcanization, and their potential for mercury capture," J. Mater. Chem. A, 2017, pp. 11682-11692, 5.

T. Hasell, et al., "Porous inverse vulcanised polymers for mercury capture," Chem. Comm., 2016, pp. 5385-5386, 52.

W. Shen, et al., "Nitrogen-containing porous carbons: synthesis and application," J. Mater. Chem. A, 2013, pp. 999-1013, 1.

H. Cong, et al., "Geometrical and Electronic Structure investigations of S-Doped Graphene," Advanced Materials Research, 2013, pp. 144-148, 669.

G. Hasegawa, et al., "Monolithic electrode for electric double-layer capacitors based on macro/meso/microporous S-Containing activated carbon with high surface area," J. Mater. Chem., 2011, pp. 2060-2063, 21.

M. Seredych, et al., "Investigation of the enhancing effects of sulfur and/or oxygen functional groups of nanoporous carbons on adsorption of dibenzothiophenes," Carbon, 2011, pp. 1216-1224, 49.

X. Liu, et al., "Moderating Black Powder Chemistry for the Synthesis of Doped and Highly Porous Graphene Nanoplatelets and Their Use in Electrocatalysis," Adv. Mater., 2013, pp. 6284-6290, 25.

\* cited by examiner

SULFUR-DOPED POROUS CARBON DERIVED FROM HEAVY HYDROCARBONS AND METHODS FOR PRODUCTION THEREOF

CROSS-REFERENCE TO RELATED APPLICATIONS

This application claims the benefit of U.S. Provisional Application No. 62/820,982, filed on Mar. 20, 2019, the entire contents of which are incorporated herein by reference.

FIELD

The present disclosure relates to sulfur-doped porous carbon and methods for production thereof.

BACKGROUND

Porous solids are used in a wide variety of applications due to their ability to sequester a range of substances. Applications in which porous solids may be used range from gas storage, gas and liquid separations, waste treatment processes, and catalysis, among others. Some porous solids are produced through designed syntheses, such as zeolites and metal-organic framework materials. Although porous solids of these types may be quite useful for various purposes, they can be somewhat expensive, especially for high-volume (commodity) applications.

Activated carbon is another type of porous solid that is widely used in a variety of sequestration processes. Conventional activated carbon materials may be produced inexpensively by pyrolyzing various carbonaceous materials such as coal, wood, coconut husks, and the like. Pyrolysis of these types of carbonaceous materials may afford a relatively uncontrolled structural morphology in terms of the pore sizes and surface areas that are obtained. Surface areas obtained for conventional activated carbon materials may be much lower than theoretically possible or practically desirable for optimal performance in a given application.

Porous carbon may be prepared via pyrolysis of sulfur-crosslinked small-molecule alkenes having structural rigidity, as described in J. C. Bear, et al., "Porous carbons from inverse vulcanized polymers," Microporous and Mesoporous Materials, 2016, pp. 189-195, 232 and J.-S. M. Lee, et "High surface area sulfur-doped microporous carbons from inverse vulcanized polymers," J. Mater. Chem. A, 2017, pp. 18603-18609, 5, Much higher surface areas are obtained in porous carbon produced through pyrolysis of sulfur-crosslinked small molecule alkenes compared to those obtained in activated carbon following pyrolysis of conventional carbonaceous materials. Although pyrolysis of sulfur-crosslinked small molecule alkenes may form porous carbon having a high surface area, the need for small-molecule alkenes having a sufficiently rigid structure can significantly compromise the utility of this approach for producing porous carbon suitable for particularly high-volume applications, mainly clue to excess starting material costs.

SUMMARY

In some embodiments, the present disclosure provides sulfur-doped porous carbon comprising: a crosslinked, pyrolyzed reaction product of a heavy hydrocarbon product, sulfur, and a hydroxide base, in which the heavy hydrocarbon product comprising a plurality of olefin moieties. At least a portion of the plurality of olefin moieties are crosslinked with the sulfur or a polymerized form thereof in the crosslinked, pyrolyzed reaction product. Sulfur-doped porous carbon of the present disclosure may be prepared by a process comprising: combining a heavy hydrocarbon product with sulfur to form a reaction mixture, heating the reaction mixture to a first temperature state to form a liquefied reaction mixture comprising a reaction intermediate comprising a sulfur-crosslinked heavy hydrocarbon product, homogenously mixing a hydroxide base with the liquefied reaction mixture, and heating the liquefied reaction mixture and the hydroxide base to a second temperature state sufficient to pyrolyze the reaction intermediate in the liquefied reaction mixture to form a crosslinked, pyrolyzed reaction product comprising sulfur-doped porous carbon.

In other various embodiments, the present disclosure provides methods for synthesizing sulfur-doped porous carbon. The methods comprise: combining a heavy hydrocarbon product with sulfur to form a reaction mixture, heating the reaction mixture to a first temperature state to form a liquefied reaction mixture comprising a reaction intermediate comprising a sulfur-crosslinked heavy hydrocarbon product, homogenously mixing a hydroxide base with the liquefied reaction mixture, and heating the liquefied reaction mixture and the hydroxide base to a second temperature state sufficient to pyrolyze the reaction intermediate in the liquefied reaction mixture to form a crosslinked, pyrolyzed reaction product comprising sulfur-doped porous carbon.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one of ordinary skill in the art and having the benefit of this disclosure.

DETAILED DESCRIPTION

The present disclosure generally relates to sulfur-doped porous carbon and, more specifically, to sulfur-doped porous carbon formed from various low-value hydrocarbon products, such as refinery streams featuring a plurality of olefin moieties.

As discussed above, porous solids, including activated carbon and other porous carbon materials, may have utility in a wide range of applications. A particularly suitable type of porous carbon material is sulfur-doped porous carbon, which may be prepared conventionally by crosslinking small-molecule alkenes having a rigid structure with sulfur and then pyrolyzing. Although porous carbon prepared in this manner can be suitable for a variety of purposes, the need for a rigid alkene structure of relatively high product quality may be problematic in terms of raw material costs, particularly for high-volume applications.

The present disclosure demonstrates that sulfur-doped porous carbon may be advantageously prepared from alternative hydrocarbon sources containing one or more olefinic moieties. In particular, the present disclosure demonstrates that various heavy hydrocarbon products containing a plurality of olefinic moieties, such as those produced as a byproduct of petroleum refining, may be converted into sulfur-doped porous carbon according to the disclosure herein. Several benefits may be realized by using such heavy hydrocarbon products as a source of olefinic moieties, as described hereinafter. Illustrative heavy hydrocarbon products that may be converted into sulfur-doped porous carbon according to the disclosure herein include steam cracker tar, heavy coker gas oil, asphaltenes, light cycle oil, C3-C5 rock, slurry hydroprocessing product fractions, visbreaker bottoms, once-through scrubber bottoms, residue hydroconversion bottoms, flash zone gas oil, ebullated bed bottoms, vacuum gas oil, atmospheric residue, vacuum residue, light coker gas oil, or any combination thereof. Compounds associated with such heavy hydrocarbon products and their properties will be familiar to one having ordinary skill in the art. Although not a classical heavy hydrocarbon, steam cracked naphtha may also be suitable for use in the disclosure herein, given its high alkene and diene content.

Sulfur-doped porous carbon prepared from heavy hydrocarbon products may provide a number of competitive advantages and surprising results. In comparison to small-molecule alkene sources having a rigid structure, such as dicyclopentadiene, heavy hydrocarbon products represent a much less expensive source of alkenes for sulfur-crosslinking and formation of porous carbon. In fact, many heavy hydrocarbon products obtained from petroleum refining are essentially waste streams, since further processing such streams to afford higher-value materials is often more expensive than simply collecting them as a waste product. For example, heavy hydrocarbon products may need to be hydrodesulfurized and/or demetallated in order to make them suitable for conventional uses, but not when forming the sulfur-doped porous carbon disclosed herein. Thus, the sulfur-doped porous carbon and associated processes disclosed herein may allow otherwise very low-value streams to be converted into a valuable product. Moreover, because sulfur is also produced in abundance as a low-value waste product of hydrodesulfurization processes in the petroleum industry, the processes disclosed herein also provide a ready sink for excess sulfur. Thus, converting a heavy hydrocarbon product and sulfur into a material having commercial value provides beneficial synergy for petroleum refining. In addition, because both heavy hydrocarbon products and excess sulfur may be produced at the same refining site, the processes disclosed herein may be particularly advantageous for their potential to lower transportation and production costs.

In addition to the foregoing economic advantages, using heavy hydrocarbon products as a source of olefin moieties to form sulfur-doped porous carbon may afford performance advantages compared those attainable when more expensive olefin sources are used. In particular, sulfur-doped porous carbon prepared according to the disclosure herein may exhibit higher gas adsorption properties compared to that attainable with sulfur-doped porous carbon prepared using higher-cost alkenes. Surprisingly, the higher degree of gas adsorption may be realized even when the sulfur-doped porous carbon of the present disclosure has the same or even a slightly smaller surface area than that produced from higher-cost alkenes. Without being bound by any theory or mechanism, the higher degree of gas adsorption, particularly for adsorption of carbon dioxide, is believed to arise from trace metals that commonly reside within heavy hydrocarbon products obtained from petroleum refining. The trace metals are believed to remain as trace metal inclusions in the sulfur-doped porous carbon obtained following pyrolysis, thereby providing additional sites for gas adsorption that are not available in sulfur-doped porous carbon prepared from more refined sources of olefin moieties. As such, the sulfur-doped porous carbon of the present disclosure may behave as if the surface area is higher than that apparently present.

All numerical values within the detailed description and the claims herein are modified by "about" or "approximately" with respect to the indicated value, and take into account experimental error and variations that would be expected by a person having ordinary skill in the art. Unless otherwise indicated, room temperature is about 25° C.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A", and "B."

For the purposes of the present disclosure, the new numbering scheme for groups of the Periodic Table is used. In said numbering scheme, the groups (columns) are numbered sequentially from left to right from 1 through 18, excluding the f-block elements (lanthanides and actinides).

The term "hydrocarbon" refers to a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different numbers of carbon atoms. Optional heteroatom substitution may be present. The term "$C_n$" refers to hydrocarbon(s) or a hydrocarbyl group having n carbon atom(s) per molecule or group, wherein n is a positive integer. Such hydrocarbon compounds may be one or more of linear, branched, cyclic, acyclic, saturated, unsaturated, aliphatic, or aromatic.

The terms "saturated" or "saturated hydrocarbon" refer to a hydrocarbon or hydrocarbyl group in which all carbon atoms are bonded to four other atoms or are bonded to three other atoms with one unfilled valence position thereon.

The terms "unsaturated" or "unsaturated hydrocarbon" refer to a hydrocarbon or hydrocarbyl group in which one or more carbon atoms are bonded to less than four other atoms, optionally with one unfilled valence position on the one or more carbon atoms. More specifically, unsaturated carbon atoms may possess at least one carbon-carbon double bond and/or at least one carbon-carbon triple bond.

The terms "hydrocarbyl" and "hydrocarbyl group" are used interchangeably herein. The term "hydrocarbyl group" refers to any $C_1$-$C_{100}$ hydrocarbon group bearing at least one unfilled valence position when removed from a parent compound. "Hydrocarbyl groups" may be optionally substituted, in which the term "optionally substituted" refers to replacement of at least one hydrogen atom or at least one carbon atom with a heteroatom or heteroatom functional group. Heteroatoms may include, but are not limited to, B, O, N, S, P, F, Cl, Br, I, Si, Pb, Ge, Sn, As, Sb, Se, and Te. Heteroatom functional groups that may be present in substituted hydrocarbyl groups include, but are not limited to, functional groups such as O, S, S=O, S(=O)$_2$, NO$_2$, F, Cl, Br, I, NR$_2$, OR, SeR, TeR, PR$_2$, AsR$_2$, SbR$_2$, SR, BR$_2$, SiR$_3$, GeR$_3$, SnR$_3$, PbR$_3$, where R is a hydrocarbyl group or H. Suitable hydrocarbyl groups may include alkyl, alkenyl, alkynyl, aryl, aralkyl, heteroaryl, cycloalkyl, heterocyclyl, and the like, any of which may be optionally substituted.

The term "alkyl" refers to a hydrocarbyl group having no unsaturated carbon-carbon bonds, and which may be optionally substituted. The term "alkylene" refers to an alkyl group having at least two open valence positions.

The term "alkenyl" refers to a hydrocarbyl group having a carbon-carbon double bond, and which may be optionally substituted. The terms "alkene" and "olefin" are used synonymously herein and refer to a hydrocarbon compound having at least one carbon-carbon double bond. Similarly, the terms "alkenic" and "olefinic" are used synonymously herein. Unless otherwise noted, all possible geometric isomers are encompassed by these terms. The term "diene" refers to an alkenyl group having two carbon-carbon double bonds.

The terms "aromatic" and "aromatic hydrocarbon" refer to a hydrocarbon or hydrocarbyl group having a cyclic arrangement of conjugated pi-electrons that satisfy the Hückel rule. The term "aryl" is equivalent to the term "aromatic" as defined herein. The term "aryl" refers to both aromatic compounds and heteroaromatic compounds, either of which may be optionally substituted. Both mononuclear and polynuclear aromatic and heteroaromatic compounds are encompassed by these terms. The term "arylene" refers to an aryl group having at least two open valence positions.

The term "polyaromatic hydrocarbon" refers to a hydrocarbyl group bearing at least two aromatic rings, which may be fused or unfused. Optional heteroatom substitution may be present in one or more of the at least two aromatic rings.

The term "linear" refers to a hydrocarbon or hydrocarbyl group having a continuous carbon chain without side chain branching, in which the continuous carbon chain may be optionally substituted with heteroatoms or heteroatom groups.

The terms "branch" and "branched" refer to a hydrocarbon or hydrocarbyl group having a linear main carbon chain or cyclic carbon ring in which a hydrocarbyl side chain extends from the linear main carbon chain or cyclic carbon ring. Optional heteroatom substitution may be present in the linear main carbon chain, the cyclic carbon ring, or in the hydrocarbyl side chain.

The term "heavy hydrocarbon product" refers to a low-value refinery product obtained from crude oil, including fractions that are both distillable and non-distillable at reduced pressures. Non-distillable heavy hydrocarbon products obtained from an initial atmospheric pressure distillation may be particularly useful according to the disclosure herein. Boiling points of such heavy hydrocarbons may range from about 200° C. to about 600° C. As illustrative examples, light coker gas oil may have a boiling point ranging from a T$_{10}$ value of 224° C., a T$_{50}$ value of 284° C. and a T$_{90}$ value of 354° C.; heavy coker gas oil may have a boiling point ranging from a T$_{10}$ value of 362° C., a T$_{50}$ value of 444° C. and a T$_{90}$ value of 551° C.; and main column bottoms may have a boiling point ranging from a T$_{10}$ value of 352° C., a T$_{50}$ value of 417° C. and a T$_{90}$ value of 509° C.

The term "pyrolysis" and grammatical variants thereof refers to the process of heating to a high temperature under an inert atmosphere. Optionally, a catalyst may be present to promote fluid catalytic cracking or hydrocracking.

The term "small-molecule" refers to a hydrocarbon compound or hydrocarbyl group having a molecular weight of about 300 or less.

The term "homogeneous" and grammatical variants thereof refers to the condition of being uniform. For example, the condition of being homogenously mixed, refers to blending a substance such that the substance is mixed uniformly in a particular medium.

The present disclosure describes sulfur-doped porous carbon that is a crosslinked, pyrolyzed reaction product of a heavy hydrocarbon product, sulfur, and optionally a hydroxide base, such as an alkali metal hydroxide base. In particular, a plurality of olefin moieties in the heavy hydrocarbon product may undergo crosslinking in the presence of sulfur when heated to a sufficiently high temperature to form a sulfur-crosslinked heavy hydrocarbon product, with at least a portion of the sulfur remaining as a dopant in the reaction product following pyrolysis. High surface area reaction products may be obtained, particularly when a hydroxide base is combined with the sulfur-crosslinked heavy hydrocarbon product prior to pyrolysis.

Accordingly, sulfur-doped porous carbon of the present disclosure nay comprise a crosslinked, pyrolyzed reaction product of a heavy hydrocarbon product, sulfur, and a hydroxide base, in which the heavy hydrocarbon product comprises a plurality of olefin moieties and at least a portion of the olefin moieties are crosslinked with the sulfur or a polymerized form thereof in the crosslinked, pyrolyzed reaction product. Although sulfur-doped porous carbon having acceptable porosity may be formed as a reaction product of a suitable heavy hydrocarbon product even when a hydroxide base is not present, increased surface area values may be realized when a hydroxide base is included when pyrolyzing to form the reaction product.

In particular embodiments of the present disclosure, the hydroxide base may be an alkali metal hydroxide base. Suitable alkali metal hydroxide bases may include, for example, lithium hydroxide, sodium hydroxide, potassium hydroxide, rubidium hydroxide, cesium hydroxide, the like, and any combination thereof. Other suitable bases other than alkali metal hydroxide bases may include bases such as ammonium hydroxide, sodium nitrate, potassium nitrate, cesium nitrate, sodium carbonate, potassium carbonate, cesium carbonate, and the like.

The amount of hydroxide base used may be measured relative to the total weight of compounds containing an olefin moiety (e.g., heavy hydrocarbon products plus an optional small-molecule alkene) plus a weight of sulfur used during crosslinking. When used, the amount of the hydroxide base, particularly an alkali metal hydroxide base, may range from about 10% of the total weight of sulfur plus compounds containing an olefin moiety to about 1000% of the total weight of sulfur plus compounds containing an olefin moiety. In more particular embodiments, the amount of hydroxide base may range from about 10% to about 500%, or about 50% to about 250%, or about 50% to about 75%, or about 50% to about 150%, or about 50% to about 100% of the total weight of sulfur plus compounds containing an olefin moiety.

The amount of the heavy hydrocarbon product to sulfur prior to pyrolysis may be about 100% or higher on a mass basis, according to various embodiments of the present disclosure. In particular embodiments, the amount of the heavy hydrocarbon product relative to sulfur may range from about 100% to about 1000%, or about 100% to about 600%, or about 100% to about 400%, or about 100% to about 200% on a mass basis, Advantageously, the ratio of the heavy hydrocarbon product to the sulfur may be adjusted to modulate the surface area of the sulfur-doped porous carbon that is obtained as the reaction product following pyrolysis.

Following pyrolysis, the sulfur-doped porous carbon of the present disclosure may comprise a crosslinked, pyrolyzed reaction product that has a sulfur content ranging from about 2 wt. % to about 10 wt. %, or about 3 wt. % to about 7 wt. %.

Optionally, a small-molecule alkene, such as dicyclopentadiene, may undergo crosslinking with sulfur in combination with the heavy hydrocarbon product. When present, the amount of the small-molecule alkene may range from about 10% to about 200% of the amount of sulfur on a mass basis prior to pyrolysis. In more particular embodiments, the amount of the small-molecule alkene may range from about 50% to about 150% of the amount of sulfur on a mass basis prior to pyrolysis. Other suitable small-molecule alkenes that may be combined with the heavy hydrocarbon product during sulfur crosslinking include, for example, 5-ethylidene-2-norbornene, 5-vinylidene-2-norbornene, and any combination thereof.

Heavy hydrocarbon products suitable for use in forming the sulfur-doped porous carbon disclosed herein may be obtained from any source, provided that a sufficient amount of alkene moieties are present for sulfur crosslinking to take place. Heavy hydrocarbon products particularly suitable for use in the disclosure herein may comprise a refinery process stream, illustrative examples of which are provided hereinbelow. Suitable heavy hydrocarbon products may be aliphatic, aromatic, or any combination thereof and may comprise only carbon and hydrogen, or optional heteroatoms may be present in some embodiments. Heteroatoms such as nitrogen, oxygen or sulfur, for example, may replace one or more ring or chain carbon atoms in at least a portion of the heavy hydrocarbon products suitable for use in the disclosure herein.

Illustrative amounts of olefin moieties that may be present in the heavy hydrocarbon products suitable for use in the disclosure herein range from about 2% to about 40% on a molar basis, or about 5% to about 30% on a molar basis. In more particular embodiments, the heavy hydrocarbon products may comprise about 0.5% to about 2% olefin moieties on a per-weight basis.

Particularly suitable heavy hydrocarbon products obtained as a refinery process stream may include steam cracker tar, heavy coker gas oil, or any combination thereof, Other heavy hydrocarbon products that may be suitable for use in forming sulfur-doped porous carbon according to the disclosure herein include, for example, for example, main column bottoms, vacuum residue, atmospheric residue, light coker gas oil, C5 rock, C3-C5 rock, slurry oil, asphaltenes, bitumen, K-pot bottoms, lube extracts, light cycle oil, slurry hydroprocessing product fractions, visbreaker bottoms, once through scrubber bottoms, resid hydroconversion bottoms, flash zone gas oil, ebullated bed bottoms, and any combination thereof. Compositions defined by these terms and properties thereof will be familiar to one having ordinary skill in the art. Further identifying description of certain refinery process streams is provided hereinafter.

Steam cracker tar (also referred to as steam cracked tar or pyrolysis fuel oil) may comprise a suitable source of olefin moieties for crosslinking in some embodiments of the present disclosure. Steam cracker tar represents the high molecular weight material obtained following pyrolysis of a hydrocarbon feedstock into olefins, as described, for example, in U.S. Pat. No. 8,709,233, which is incorporated herein by reference. Suitable steam cracker tar may or may not have had asphaltenes removed therefrom. Steam cracker tar may be obtained from the first fractionator downstream from a steam cracker (pyrolysis furnace) as the bottoms product of the fractionator, nominally having a boiling point of 550° F. or above (288° C. or above). In particular embodiments, steam cracker tar may be obtained from a pyrolysis furnace producing a vapor phase including ethylene, propylene, and butenes; a liquid phase separated as an overhead phase in a primary fractionation step comprising $C_{5+}$ species including a naphtha fraction (e.g., $C_5$-$C_{10}$ species) and a steam cracked gas oil fraction (primarily $C_{10}$-$C_{15}$/$C_{17}$ species having an initial boiling range of about 400° F. to 550° F.); and a bottoms fraction comprising steam cracker tar having a boiling point range above about 550° F. and comprising $C_{15}$/$C_{17+}$ species. Such heavy hydrocarbons may comprise about 5 wt. % olefins or less.

Vacuum residue may comprise a suitable heavy hydrocarbon product in some embodiments of the present disclosure. Like its name suggests, "vacuum residue" is the residual material obtained from a distillation tower following vacuum distillation. Vacuum residue may have a nominal boiling point range of about 500° C. or higher or about 600° C. or higher.

C3 rock or C3-C5 rock may comprise a suitable heavy hydrocarbon product in some embodiments of the present disclosure. C3-C5 rock refers to asphaltenes that have been further treated with propane, butanes and pentanes in a deasphalting unit. Likewise, C3 rock refers to asphaltenes that have been further treated with propane. C3 and C3-C5 rock may be high in metals like Ni and V and may contain high amounts of N and S heteroatoms in heteroaromatic rings.

Bitumen or asphaltenes may comprise a suitable heavy hydrocarbon product in some embodiments of the present disclosure. In general, asphaltenes refer to a solubility class of materials that precipitate or separate from an oil when in contact with paraffins (e.g., propane, butane, pentane, hexane or heptane). Bitumen traditionally refers to a material obtained from oil sands and represents a full-range, higher-boiling material than raw petroleum.

In particular embodiments, a plurality of metal inclusions may be present in the sulfur-doped porous carbon formed according to the disclosure herein. The one or more metal inclusions may arise from any source, but in particular embodiments, the one or more metal inclusions may arise from the heavy hydrocarbon product. Specifically, in particular embodiments of the present disclosure, the heavy hydrocarbon product may comprise one or more trace metals that remain as a plurality of metal inclusions in the crosslinked, pyrolyzed reaction product. Among metals that may be present in the heavy hydrocarbon product or the sulfur-doped porous carbon resulting therefrom include, for example, V, Ni, Zn, Mg, Ca, Cr, Fe or any combination thereof.

Sulfur-doped porous carbon of the present disclosure may be further characterized in terms of various physical properties, as discussed hereinafter. Illustrative physical properties of the sulfur-doped porous carbon that may provide suitable characterization include, for example, BET surface area, molecular weight, gas adsorption capacity (e.g., carbon dioxide, hydrogen and/or nitrogen adsorption capacity), elemental composition (particularly sulfur), or any combination thereof.

In some embodiments, sulfur-doped porous carbon of the present disclosure may comprise a crosslinked, pyrolyzed reaction product having a BET surface area ranging from about 750 $m^2/g$ to about 2000 $m^2/g$ or from about 400 $m^2/g$ to about 3000 $m^2/g$. Determination of the BET surface area may be performed through analysis of $N_2$ adsorption isotherms obtained at 77 K, as will be understood by one having ordinary skill in the art.

The sulfur-doped porous carbon of the present disclosure may exhibit particularly high selectivity for adsorption of carbon dioxide. In particular embodiments, the crosslinked, pyrolyzed reaction product may exhibit a $CO_2$ adsorption capacity of at least about 1.5 mmol/g or at least about 2 mmol/g at 298 K. Determination of the $CO_2$ adsorption capacity may be performed by further analysis of the $CO_2$ adsorption isotherm. The sulfur-doped porous carbon may exhibit a selectivity of at least about 40:1 for adsorption of $CO_2$ compared to hydrogen at 298 K or a selectivity of at least about 40:1 for adsorption of $CO_2$ compared to nitrogen at 298 K, according to various embodiments of the present disclosure.

In some embodiments, sulfur-doped porous carbon of the present disclosure may comprise a crosslinked, pyrolyzed reaction product that has a molecular weight of at least about three times that of the heavy hydrocarbon product. Determination of the molecular weights of the heavy hydrocarbon product and the crosslinked, pyrolyzed reaction product may be performed by gel-permeation chromatography (GPC), according to particular embodiments of the present disclosure. Molecular weight determination by GPC may be made relative to a linear polystyrene standard, according to various embodiments of the present disclosure.

In more particular embodiments, the molecular weight (peak molecular weight as determined by GPC) of the crosslinked, pyrolyzed reaction product may range from about 100 to about 25,000 g/mol, or about 500 to about 20,000 g/mol. In some or other embodiments, the molecular weight of the heavy hydrocarbon product before crosslinking and pyrolysis may range from about 100 to about 4,500 g/mol, or about 200 to about 4,000 g/mol. The average molecular weight of the crosslinked, pyrolyzed reaction product may range from about 400 to about 1000 g/mol, or about 500 to about 800 g/mol.

As referenced above, the sulfur-doped porous carbon of the present disclosure may be prepared by combining a suitable heavy hydrocarbon product and elemental sulfur ($S_8$), which is then heated to a first temperature state to liquefy the sulfur and promote crosslinking of the olefin moieties with the sulfur or a polymerized variant thereof. Optionally and preferably, a hydroxide base may be thoroughly mixed with the sulfur-crosslinked heavy hydrocarbon product following crosslinking and prior to pyrolysis. Thereafter, the sulfur-crosslinked heavy hydrocarbon product and hydroxide base admixed therewith may then be heated to a second temperature state that is sufficient to affect pyrolysis, thereby forming sulfur-doped porous carbon as provided above. Uniform mixing of the hydroxide base may provide desirably high surface areas in the sulfur-doped porous carbon obtained following pyrolysis.

Accordingly, sulfur-doped porous carbon of the present disclosure may be further characterized in terms of being prepared by processes comprising combining a heavy hydrocarbon product with sulfur to form a reaction mixture, heating the reaction mixture to a first temperature state to form a liquefied reaction mixture comprising a reaction intermediate comprising a sulfur-crosslinked heavy hydrocarbon product, homogeneously mixing a hydroxide base with the liquefied reaction mixture, and heating the liquefied reaction mixture to a second temperature state sufficient to pyrolyze the reaction intermediate in the liquefied reaction mixture to form a crosslinked, pyrolyzed reaction product comprising sulfur-doped porous carbon. A small molecule-alkene may be included with the heavy hydrocarbon product and the sulfur in the reaction mixture, according to particular embodiments of the present disclosure.

Similarly, processes for synthesizing the sulfur-doped porous carbon of the present disclosure may comprise combining a heavy hydrocarbon product with sulfur to form a reaction mixture, heating the reaction mixture to a first temperature state to form a liquefied reaction mixture comprising a reaction intermediate comprising a sulfur-crosslinked heavy hydrocarbon product, homogeneously mixing a hydroxide base with the liquefied reaction mixture, and heating the liquefied reaction mixture to a second temperature state sufficient to pyrolyze the reaction intermediate in the liquefied reaction mixture to form a crosslinked, pyrolyzed reaction product comprising sulfur-doped porous carbon.

In the foregoing, the first temperature state is the temperature at which sulfur crosslinking takes place with the olefin moieties in the heavy hydrocarbon product. In various embodiments, the first temperature state may comprise a temperature of about 200° C. or less. In more particular embodiments, the first temperature state may comprise a temperature of about 100° C. to about 200° C., or about 150° C. to about 190° C., or about 150° C. to about 170° C. Heating may be conducted under a flowing inert gas, such as nitrogen, according to various embodiments of the present disclosure.

In the foregoing, the second temperature state is the temperature at which pyrolysis of the sulfur-crosslinked heavy hydrocarbon product takes place. In various embodiments, the second temperature state may comprise a temperature of about 500° C. or higher or about 700° C. or higher. In more particular embodiments, the second temperature state may comprise a temperature of about 600° C. to about 800° C., or about 700° C. to about 850° C., or about 650° C. to about 800° C., or about 700° C. to about 800° C. Initial heating may be conducted at an intermediate temperature below that where pyrolysis takes place, such as to drive off gaseous reaction products like hydrogen sulfide. Heating at the second temperature state may conducted under an inert atmosphere. Suitable inert atmospheres may comprise an inert gas such as nitrogen, helium, or argon, for example.

As referenced above, suitable hydroxide bases for forming the sulfur-doped porous carbon disclosed herein may comprise an alkali metal hydroxide base in more particular embodiments of the present disclosure. Particular examples and amounts of suitable alkali metal hydroxide bases are discussed above. Potassium hydroxide may be a particularly desirable alkali metal base due to its ability to promote pore formation and increase the surface area of the sulfur-doped porous carbon disclosed herein.

Similarly, suitable ratios of sulfur to the heavy hydrocarbon product and/or the small-molecule alkene used in the present disclosure are discussed in more detail above. In particular embodiments, a ratio of the heavy hydrocarbon product to the sulfur may be amount 1:1 or greater on a weight basis.

Embodiments disclosed herein include:

A. Sulfur-doped porous carbon comprising: a crosslinked, pyrolyzed reaction product of a heavy hydrocarbon product, sulfur, and a hydroxide base, the heavy hydrocarbon product comprising a plurality of olefin moieties; wherein at least a portion of the plurality of olefin moieties are crosslinked with the sulfur or a polymerized form thereof in the crosslinked, pyrolyzed reaction product.

B. Sulfur-doped porous carbon prepared by a process comprising: combining a heavy hydrocarbon product with sulfur to form a reaction mixture; heating the reaction mixture to a first temperature state to form a liquefied reaction mixture comprising a reaction intermediate comprising a sulfur-crosslinked heavy hydrocarbon product; homogenously mixing a hydroxide base with the liquefied reaction mixture; and heating the liquefied reaction mixture and the hydroxide base to a second temperature state sufficient to pyrolyze the reaction intermediate in the liquefied reaction mixture to form a crosslinked, pyrolyzed reaction product comprising sulfur-doped porous carbon.

C. Processes for forming sulfur-doped porous carbon. The processes comprise: combining a heavy hydrocarbon product with sulfur to form a reaction mixture; heating the reaction mixture to a first temperature state to form a liquefied reaction mixture comprising a reaction intermediate comprising a sulfur-crosslinked heavy hydrocarbon product; homogenously mixing a hydroxide base with the liquefied reaction mixture; and heating the liquefied reaction mixture and the hydroxide base to a second temperature state sufficient to pyrolyze the reaction intermediate in the liquefied reaction mixture to form a crosslinked, pyrolyzed reaction product comprising sulfur-doped porous carbon.

Embodiments A-C may have one or more of the following additional elements in any combination:

Element 1: wherein the crosslinked, pyrolyzed reaction product has a molecular weight that is at least about three times that of the heavy hydrocarbon product.

Element 2: wherein the heavy hydrocarbon product is a refinery process stream selected from the group consisting of steam cracker tar, heavy coker gas oil, and any combination thereof.

Element 3: wherein the crosslinked, pyrolyzed reaction product has a BET surface area ranging from about 750 $m^2/g$ to about 3000 $m^2/g$.

Element 4: wherein the heavy hydrocarbon product comprises one or more trace metals that remain as a plurality of trace metal inclusions in the crosslinked, pyrolyzed reaction product.

Element 5: wherein the one or more trace metals comprise a metal selected from the group consisting of V, Ni, Zn, Mg, Ca, Cr, Fe, and any combination thereof.

Element 6: wherein the crosslinked, pyrolyzed reaction product exhibits a $CO_2$ adsorption capacity of at least about 2 mmol/g at 298 K and 1 bar pressure.

Element 7: wherein a sulfur content of the crosslinked, pyrolyzed reaction product ranges from about 2 wt. % to about 10 wt. %.

Element 8: wherein a small-molecule alkene is included with the heavy hydrocarbon product and the sulfur in the reaction mixture.

Element 9: wherein the first temperature state comprises a temperature of about 200° C. or less.

Element 10: wherein the second temperature state comprises a temperature of about 500° C. or higher.

Element 11: wherein the second temperature state comprises a temperature of about 700° C. or higher.

Element 12: wherein heating to the second temperature state is conducted under an inert atmosphere.

Element 13: wherein the hydroxide base comprises one or more alkali metal hydroxides.

Element 14: wherein a ratio of the heavy hydrocarbon product to the sulfur is at least about 1:1 or greater.

By way of non-limiting example, exemplary combinations applicable to A include: 1 and 2; 1 and 3; 1 and 4; 1, 4 and 5; 1 and 6; 1 and 7; 1 and 8; 2 and 3; 2 and 4; 2, 4 and 5; 2 and 6; 2 and 7; 2 and 8; 3 and 4; 3-5; 3 and 6; 3 and 7; 3 and 8; 4 and 5; 4 and 6; 4 and 7; 4 and 8; 6 and 7; 6 and 8; and 7 and 8. Exemplary combinations applicable to B and C include 1 and 2; 1 and 3; 1 and 4; 1, 4 and 5; 1 and 6; 1 and 7; 1 and 8; 2 and 3; 2 and 4; 2, 4 and 5; 2 and 6; 2 and 7; 2 and 8; 3 and 4; 3-5; 3 and 6; 3 and 7; 3 and 8; 4 and 5; 4 and 6; 4 and 7; 4 and 8; 6 and 7; 6 and 8; 7 and 8; 9 and 10; 9 and 11; 9 and 12; 9 and 13; 9 and 14; 10 or 11 and 12; 10 or 11 and 13; 10 or 11 and 14; 12 and 13; 12 and 14; 13 and 14; 1 and 9; 2 and 9; 3 and 9; 4 and 9; 6 and 9; 7 and 9; 8 and 9; 1 and 10; 2 and 10; 3 and 10; 4 and 10; 6 and 10; 7 and 10; 8 and 10; 1 and 11; 2 and 11; 3 and 11; 4 and 11; 6 and 11; 7 and 11; 8 and 11; 1 and 12; 2 and 12; 3 and 12; 4 and 12; 6 and 12; 7 and 12; 8 and 12; 1 and 13; 2 and 13; 3 and 13; 4 and 13; 6 and 13; 7 and 13; 8 and 13; 1 and 14; 2 and 14; 3 and 14; 4 and 14; 6 and 14; 7 and 14; and 8 and 14.

To facilitate a better understanding of the embodiments described herein, the following examples of various representative embodiments are given. In no way should the following examples be read to limit, or to define, the scope of the present disclosure.

Examples

General Synthesis Procedure for Forming Sulfur-Doped Porous Carbon.

Figure 1:
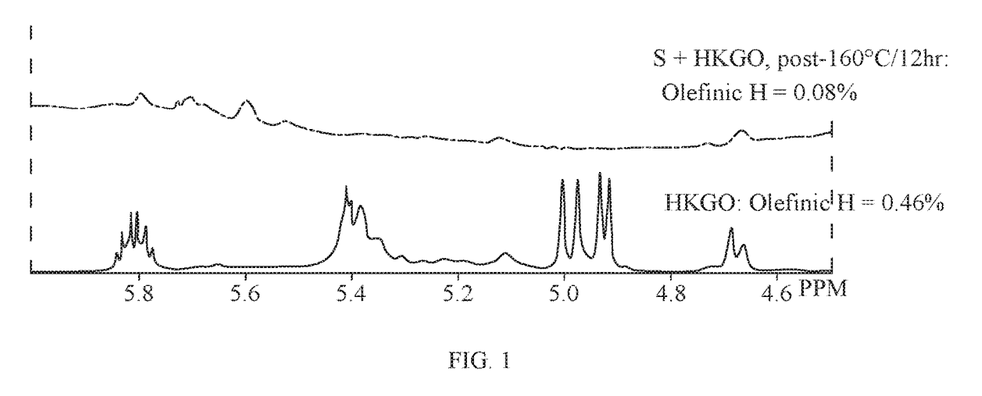
FIG. 1 shows comparative solid state $^1$H NMR data for a heavy hydrocarbon sample before and after sulfur crosslinking.

A heavy hydrocarbon sample was combined with sulfur and heated at 160° C. for 12-24 hours to affect sulfur crosslinking. A liquefied reaction mixture containing a sulfur-crosslinked intermediate formed during this time. When used, dicyclopentadiene was combined with the sulfur and the heavy hydrocarbon sample at this stage as well. After the initial heating period, a solid alkali metal base was combined with the sulfur-crosslinked intermediate and mixed well. FIG. 1 shows comparative solid state $^1$H NMR data for a heavy hydrocarbon sample before and after sulfur crosslinking. As shown, sulfur crosslinking consumed a majority of the olefinic groups in the heavy hydrocarbon sample (heavy coker gas oil-HKGO).

Thereafter, the reaction mixture was heated in a furnace at 500° C. for 2 hours to drive off $H_2S$ and other byproduct gases under a flowing inert atmosphere, and heating was then continued at 750° C. for 2 hours under a flowing inert atmosphere in a tube furnace. Pyrolysis at 750° C. led to a highly porous morphology in the product, primarily comprising graphitic carbon. The porous product was then cooled to room temperature and washed with water to remove inorganic salts. After washing, the porous product was further dried and analyzed. The remaining sulfur content following heating was approximately 5 wt. %. Solid state $^1$H NMR (not shown) showed only very broad peaks. Reactant ratios, conditions and temperatures are further specified in Table 1 below.

In the above synthesis, pyrolysis was conducted in two phases in separate furnaces due to the need to vent the initially formed $H_2S$. The tube furnace employed was unable to be properly vented in the laboratory setup used. If a tube furnace with adequate ventilation had been available, a single pyrolysis step in one furnace could have been employed.

Further discussion of the data in Table 1 follows below in regard to characterization data obtained for the samples corresponding to particular entries.

TABLE 1

| Entry | HC Type | Ratio S:HC (w/w) | Ratio S:DCPD (w/w) | Base or Salt | Ratio Base/Salt:(HC + S + DCPD) (w/w) | Max. Reaction Temperature (° C.)[1] | BET SA (m$^2$/g) | Yield (g) |
|---|---|---|---|---|---|---|---|---|
| 1 | HKGO | 1:1 | — | KOH | 1:1 | 500[2] | 9 | — |
| 2 | HKGO | 1:1 | — | KOH | 1:1 | 750 | 1217 | 0.118 |
| 3 | HKGO | 1:2 | — | KOH | 1:1 | 750 | 1886 | 0.146 |
| 4 | HKGO | 1:3 | 2:1 | KOH | 1:1 | 750 | 1886 | — |
| 5 | HKGO | 1:4 | 1:1 | KOH | 1:1 | 750 | 1710 | — |
| 6 | HKGO | 1:1 | 1:1 | KOH | 1:1 | 750 | 752 | — |
| 7 | HKGO | 2:3 | 2:1 | KOH | 1:1 | 750 | 1473 | — |
| 8 | HKGO | 2:3 | 2:1 | KOH | 1:1 | 750 | 1642 | 0.123 |
| 9 | HKGO (fresh) | 1:2 | — | KOH | 1:1 | 750 | 1714 | 0.114 |
| 10 | HKGO (fresh) | 1:3.4 | — | KOH | 1:1 | 750 | 1626 | 0.088 |
| 11 | HKGO (fresh) | 1:1.4 | — | KOH | 1:1 | 750 | 1093 | 0.062 |
| 12 | HKGO (fresh) | 7:6 | — | KOH | 1:1 | 750 | — | 0.002 |
| 13 | HKGO | 1:2 | — | none | — | 750 | 3.65 | 0.394 |
| 14 | HKGO | 1:3.6 | — | KOH | 1:1 | 750 | 1808 | 0.125 |
| 15 | HKGO | 1:6 | — | KOH | 1:1 | 750 | 1400 | 0.168 |
| 16 | HKGO | | — | KOH | 1:1 | 750 | 721 | 0.114 |
| 17 | HKGO | 1:2 | — | KOH | 1:1 | 750 | 1476 | 0.217 |
| 18 | HKGO | 1:2 | — | KOH | 0.5:1 | 750 | 894 | 0.303 |
| 19 | HKGO | 1:2 | — | KOH | 2:1 | 750 | 2051 | 0.102 |
| 20 | HKGO | 1:2 | — | KCl | 1.33:1 | 750 | 1.5 | 0.387 |
| 21 | HKGO | 1:2 | — | NaOH | 0.70:1 | 750 | 217 | 0.101 |
| 22 | HKGO | 1:2 | — | NaCl | 1.05:1 | 750 | 0.4 | 0.382 |
| 23 | — | — | 1:1 | KOH | 1:1 | 750 | 26 | — |
| 24 | SCT | 1:2 | — | KOH | 1:1 | 750 | 1149 | 0.205 |
| 25 | SCT | 1:3.3 | — | KOH | 1:1 | 750 | 650 | 0.274 |
| 26 | SCT | 1:1.4 | — | KOH | 1:1 | 750 | 654 | 0.253 |
| 27 | SCT | 7:6 | — | KOH | 1:1 | 750 | 1416 | 0.108 |

[1]Heating was first performed at 500° C. for two hours and then at 750° C. for two hours in a tube furnace.
[2]Heating in the tube furnace was not performed
HC = hydrocarbon
DCPD = dicyclopentadiene
SA = surface area
HKGO = heavy coker gas oil
SCT = steam cracker tar Comparing Entries 1 and 2, higher pyrolysis temperatures afforded a greater BET surface area in the resulting product. As shown in Entries 3-8, higher ratios of hydrocarbon to sulfur generally produced higher BET surface area values. Including (Entries 3-8) or excluding (Entries 9-12, 14 and 15) DCPD did not appear to significantly impact the BET surface area values that were obtained.

Excluding the hydroxide base (Entry 13) or not adequately mixing the hydroxide base led to poor BET surface area values. Substituting alkali metal halide salts for the hydroxide base (Entries 20 and 22) led to very poor surface area values.

Figure 2:
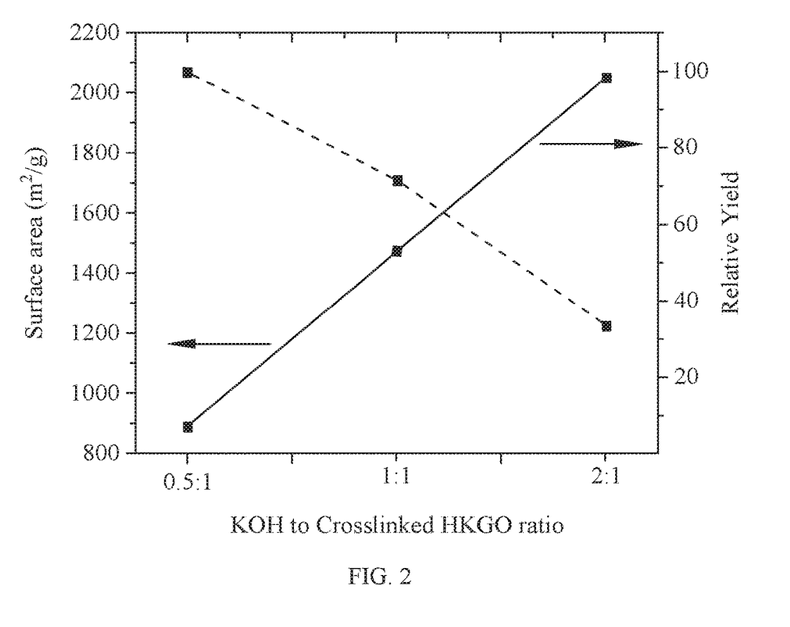
FIG. 2 shows a plot of BET surface area and yield for sulfur-doped porous carbon produced in the presence of various amounts of KOH.

Changing the ratio of the hydroxide base also altered the BET surface area values and product yields that were obtained. As shown in Entries 17-19, the BET surface area values increased with increasing amounts of potassium hydroxide, but at the cost of decreased yields. FIG. 2 shows a plot of BET surface area and yield for sulfur-doped porous carbon produced in the presence of various amounts of KOH.

Finally, as shown in Entries 24-27, steam cracker tar was also effective for producing sulfur-doped porous carbon having at least somewhat comparable BET surface values to those obtained with HKGO.

Molecular Weight Determination.

Figure 3A:
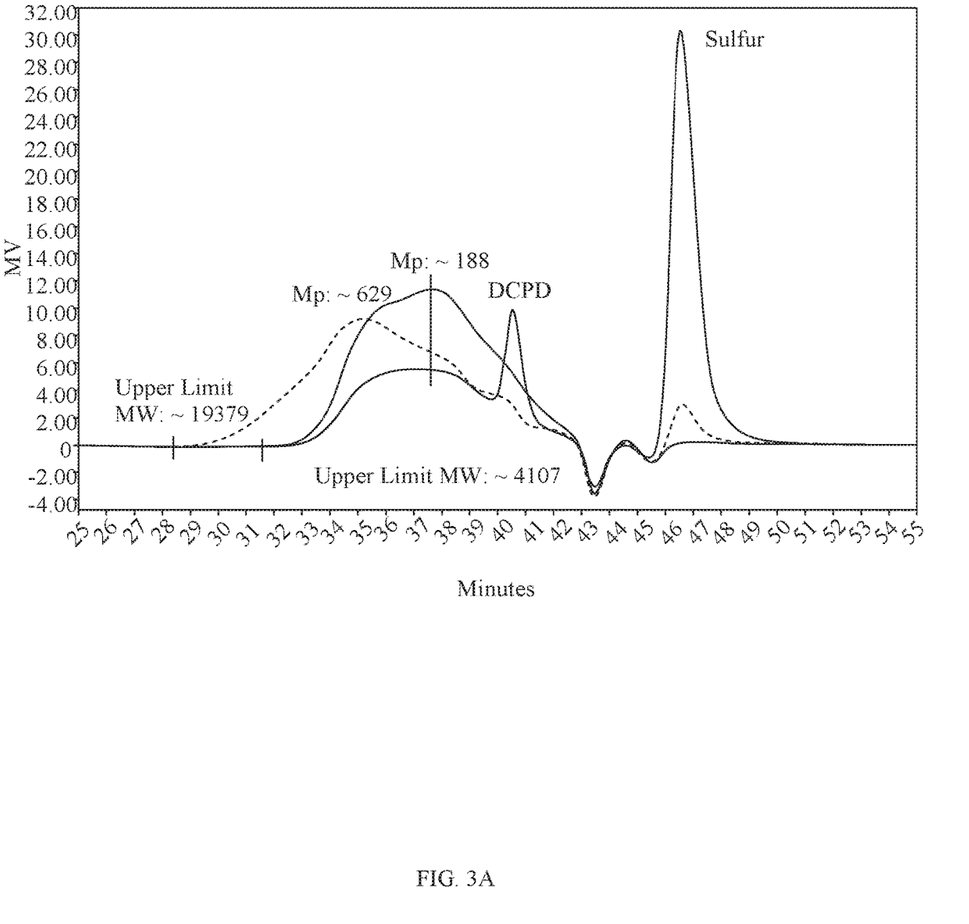
FIGS. 3A and 3B show gel permeation chromatograms for the sample of Entry 4 as assayed by a refractive index detector or a photodiode array detector at 254 nm, respectively.
Figure 3B:
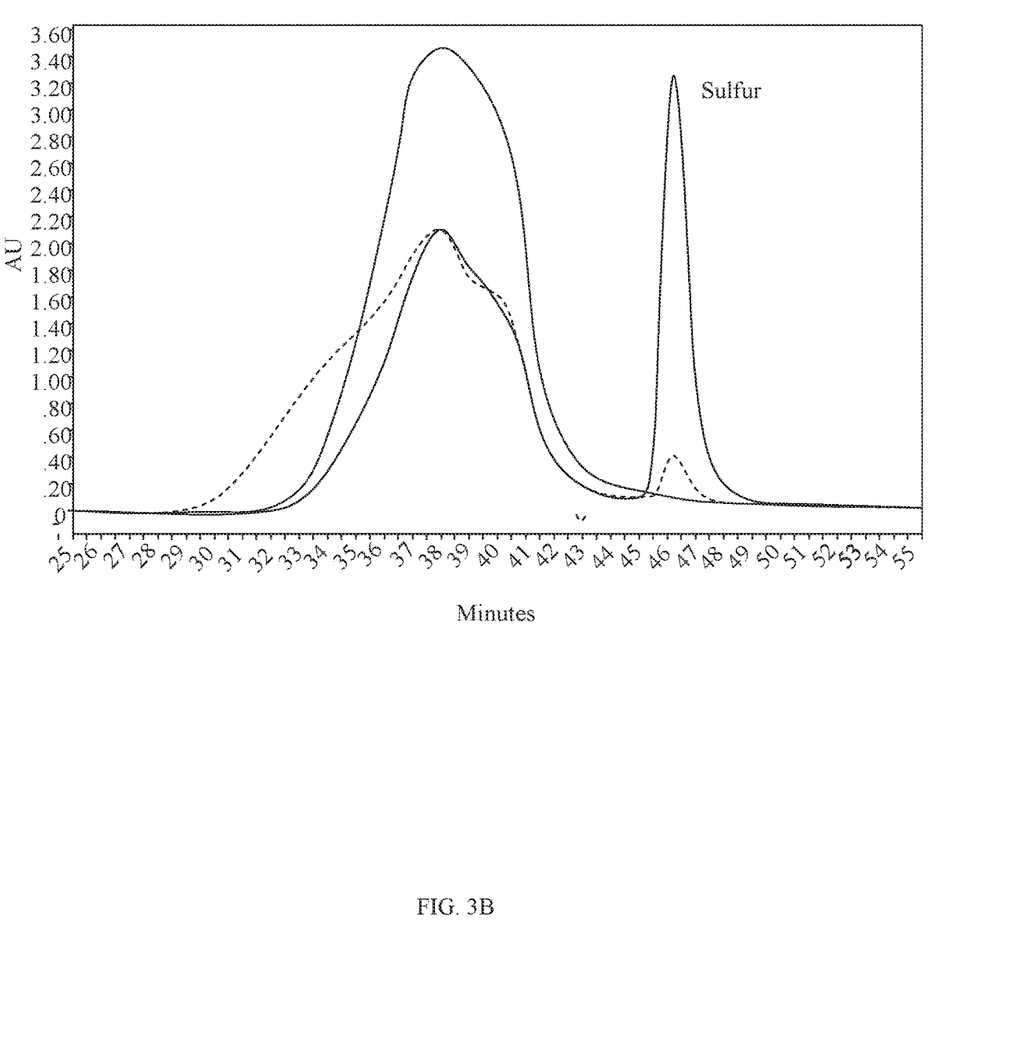

Certain products obtained as above were characterized by gel permeation chromatography (GPC) to determine molecular weight both before and after pyrolysis at 750° C. Chromatograms were obtained with a Waters Alliance 2690 chromatograph employing a 2410 refractive index detector or a 2998 photodiode array detector. The solvent used for analysis was tetrahydrofuran at a flow rate of 0.5 mL/min. The injection volume was 50 µL, and the detector and column temperatures were both 23° C. FIGS. 3A and 3B show gel permeation chromatograms for the sample of Entry 4 as assayed by a refractive index detector or a photodiode array detector at 254 nm, respectively. The chromatograms indicated that the peak molecular weight increased to an upper limit of 19379 following pyrolysis compared to the sulfur-crosslinked hydrocarbon intermediate, which had an upper limit peak molecular weight of only 4107. The peak molecular weight after pyrolysis was 629, whereas the heavy hydrocarbon itself had a peak molecular weight of 188. Thus, the molecular weight increased by at least three-fold following sulfur crosslinking according to the disclosure herein.

Gas Adsorption Properties.

Figure 4:
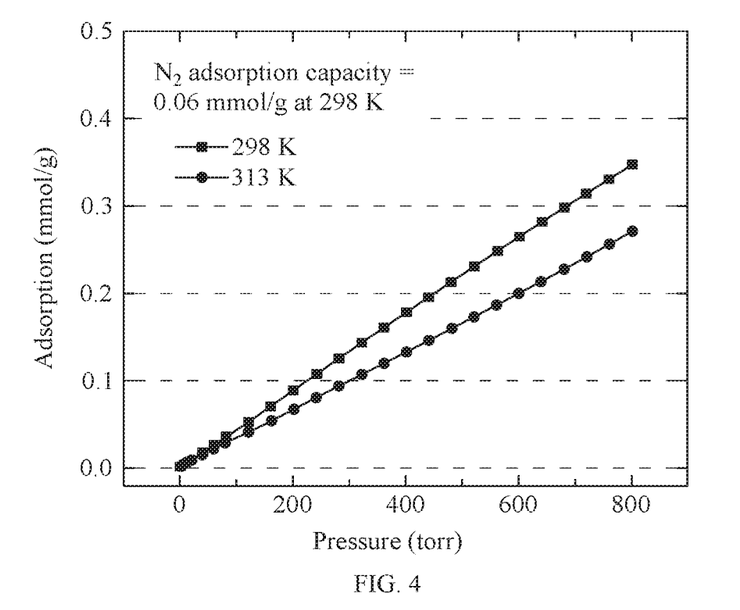
FIG. 4 shows $N_2$ adsorption isotherms of the product of Entry 3 at 298 K and 313 K.
Figure 5:
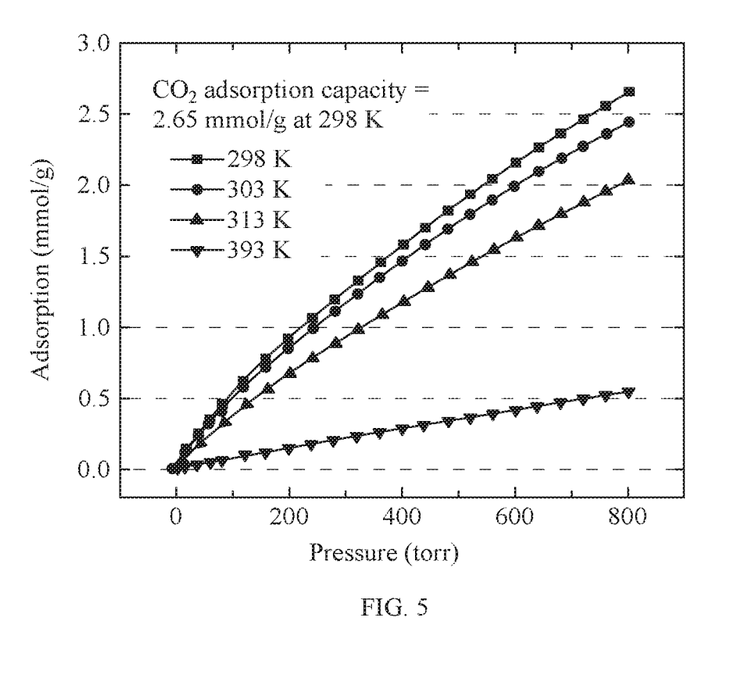
FIG. 5 shows $CO_2$ adsorption isotherms of the product of Entry 3 at 298 K, 303 K, 313 K and 393 K.
Figure 6:
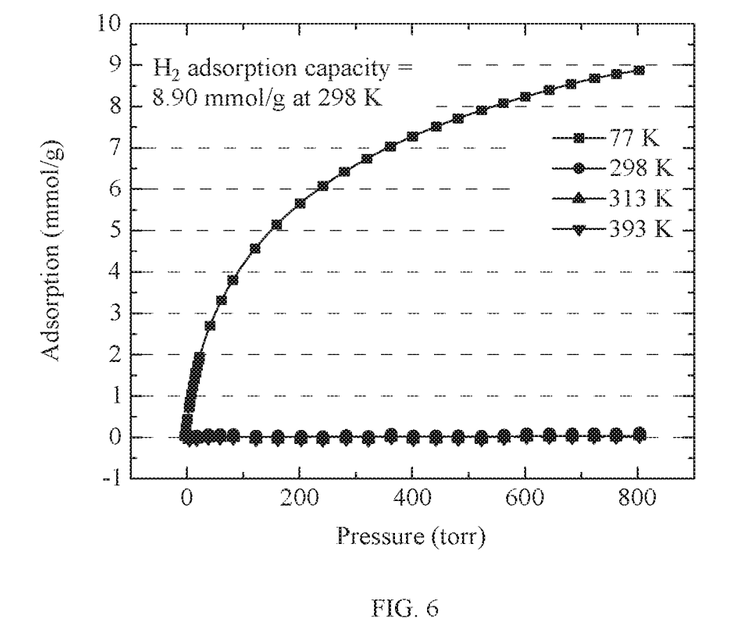
FIG. 6 shows $H_2$ adsorption isotherms of the product of Entry 3 at 77 K, 298 K, 313 K and 393 K.

The product from Entry 3 above was further characterized by N$_2$, H$_2$ and CO$_2$ adsorption isotherms at various temperatures. The sample was dried at 393 K for 4 hours prior to obtaining each adsorption isotherm. FIG. 4 shows $N_2$ adsorption isotherms of the product of Entry 3 at 298 K and 313 K. FIG. 5 shows $CO_2$ adsorption isotherms of the product of Entry 3 at 298 K, 303 K, 313 K and 393 K. FIG. 6 shows $H_2$ adsorption isotherms of the product of Entry 3 at 77 K, 298 K, 313 K and 393 K.

Figure 7:
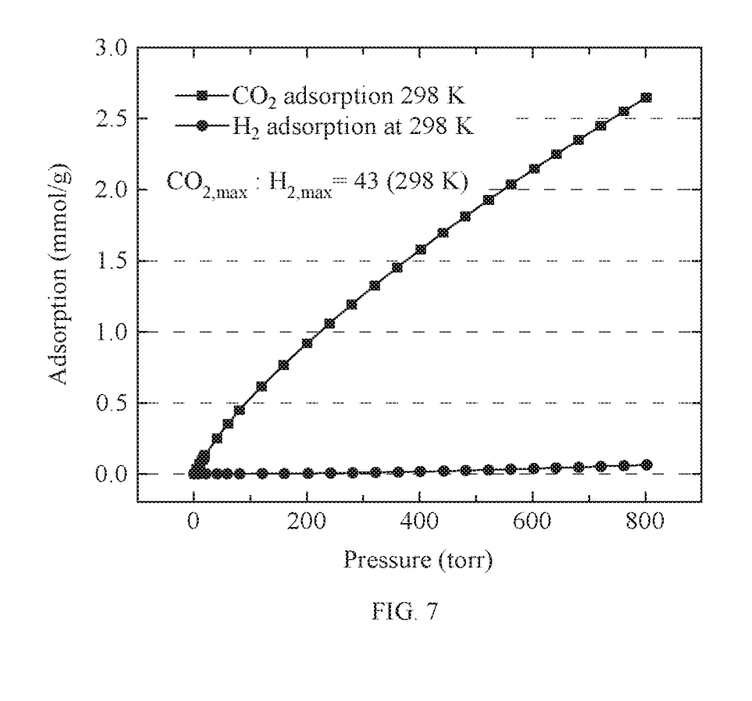
FIG. 7 shows comparative gas adsorption isotherms for $CO_2$ and $H_2$ for the product of Entry 3 at 298 K.
Figure 8:
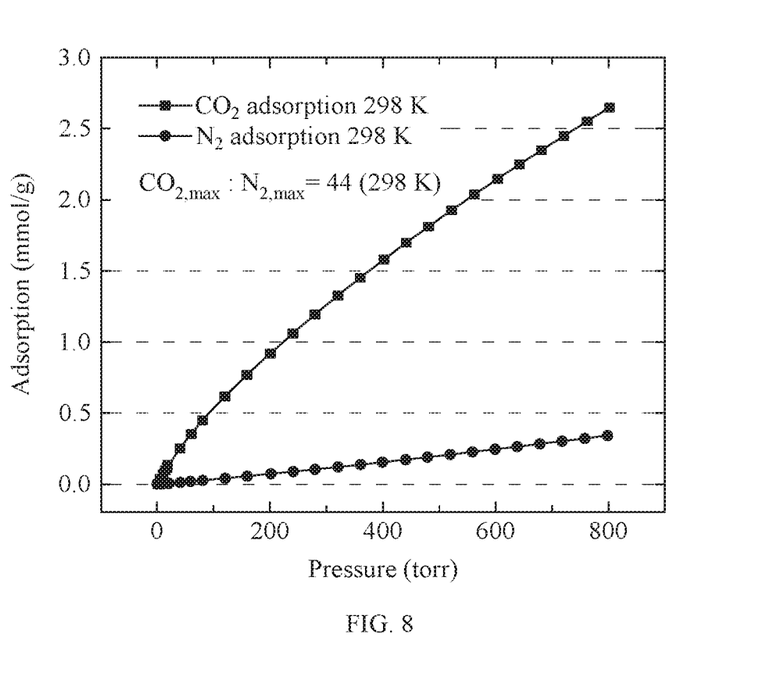
FIG. 8 shows comparative gas adsorption isotherms for $CO_2$ and $N_2$ for the product of Entry 3 at 298 K.

As shown in FIGS. 4-6, the sample exhibited low $N_2$ uptake in comparison to $CO_2$ and $H_2$. The uptake capacity for each gas is provided on the isotherm plots of FIGS. 4-6. Comparative gas adsorption isotherms illustrated that $CO_2$ was adsorbed preferentially at 298 K in comparison to either $N_2$ or $H_2$. FIG. 7 shows comparative gas adsorption isotherms for $CO_2$ and $H_2$ for the product of Entry 3 at 298 K. FIG. 8 shows comparative gas adsorption isotherms for $CO_2$ and $N_2$ for the product of Entry 3 at 298 K. Selectivity ratios for $CO_2$ adsorption over the other gases at 298 K are provided in FIGS. 7 and 8. The corresponding temperature swing adsorption capacity for $CO_2$ between 298 K and 393 K was 2.11 mmol/g, and the temperature swing adsorption capacity for $H_2$ between 77 K and 298 K was 8.84 mmol/g.

Figure 9:
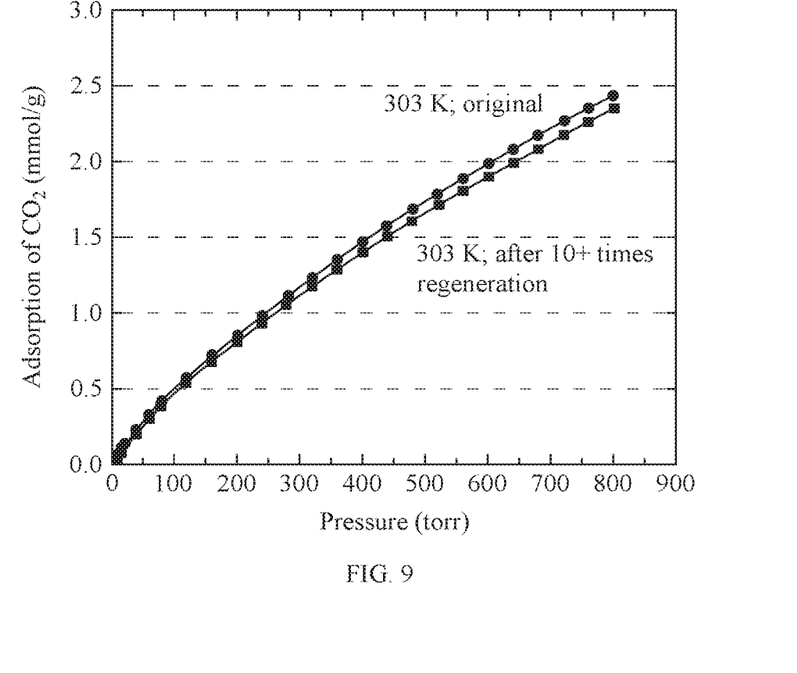
FIG. 9 shows comparative $CO_2$ adsorption isotherms at 303 K for the product of Entry 3 after 1 and 10 activation cycles.

Moreover, the sample exhibited a minimal change in its $CO_2$ adsorption capacity after multiple cycles of activation and subsequent $CO_2$ adsorption. FIG. 9 shows comparative $CO_2$ adsorption isotherms at 303 K for the product of Entry 3 after 1 and 10 activation cycles. As shown, there was minimal change (<3%) in the $CO_2$ adsorption capacity following multiple regeneration cycles.

Figure 10:
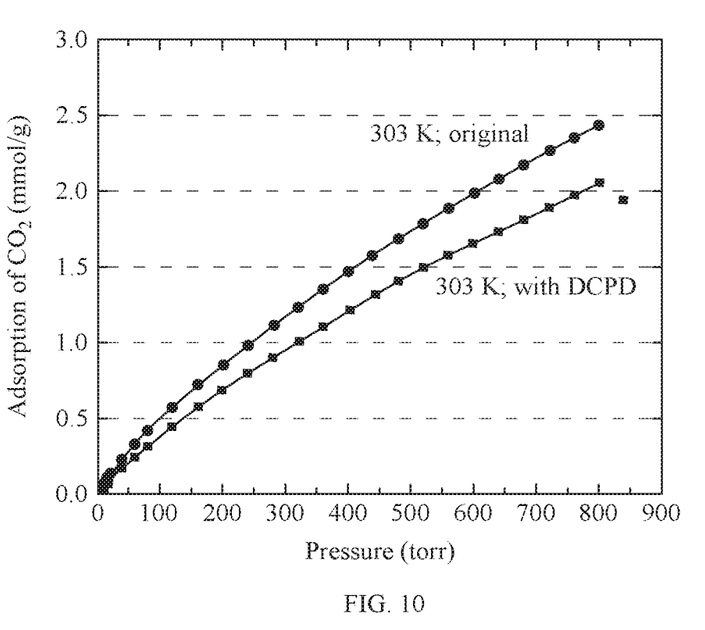
FIG. 10 shows comparative $CO_2$ adsorption isotherms at 303 K for the products of Entries 3 and 4.

FIG. 10 shows comparative $CO_2$ adsorption isotherms at 303 K for the products of Entries 3 and 4. As shown, there was a slight decrease in the $CO_2$ adsorption capacity when the rigid olefin dicylopentadiene was present in the crosslinked product.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. Sulfur-doped porous carbon comprising:
    a crosslinked, pyrolyzed reaction product of a heavy hydrocarbon product, sulfur, and a hydroxide base, the heavy hydrocarbon product comprising a plurality of olefin moieties, wherein the heavy hydrocarbon product has a boiling point range from about 200° C. to about 600° C.;
    wherein the crosslinked, pyrolyzed reaction product has a BET surface area ranging from about 750 m²/g to about 3000 m²/g;
    wherein a sulfur content of the crosslinked, pyrolyzed reaction product ranges from about 2 wt. % to about 10 wt. %; and
    wherein at least a portion of the plurality of olefin moieties are crosslinked with the sulfur or a polymerized form thereof in the crosslinked, pyrolyzed reaction product; and wherein the heavy hydrocarbon product comprises one or more trace metals that remain as a plurality of trace metal inclusions in the crosslinked, pyrolyzed reaction product.

2. The sulfur-doped porous carbon of claim 1, wherein the crosslinked, pyrolyzed reaction product has a molecular weight that is at least about three times that of the heavy hydrocarbon product.

3. The sulfur-doped porous carbon of claim 1, wherein the heavy hydrocarbon product is a refinery process stream selected from the group consisting of steam cracker tar, heavy coker gas oil, and any combination thereof.

4. The sulfur-doped porous carbon of claim 1, wherein the one or more trace metals comprise a metal selected from the group consisting of V, Ni, Zn, Mg, Ca, Cr, Fe, and any combination thereof.

5. The sulfur-doped porous carbon of claim 1, wherein the crosslinked, pyrolyzed reaction product exhibits a $CO_2$ adsorption capacity of at least about 2 mmol/g at 298 K and 1 bar pressure.

6. Sulfur-doped porous carbon prepared by a process comprising:
combining a heavy hydrocarbon product with sulfur to form a reaction mixture, wherein the heavy hydrocarbon product has boiling points from about 200° C. to about 600° C. and comprises one or more trace metals;
heating the reaction mixture to a first temperature state to form a liquefied reaction mixture comprising a reaction intermediate comprising a sulfur-crosslinked heavy hydrocarbon product;
homogenously mixing a hydroxide base with the liquefied reaction mixture; and
heating the liquefied reaction mixture and the hydroxide base to a second temperature state sufficient to pyrolyze the reaction intermediate in the liquefied reaction mixture to form a crosslinked, pyrolyzed reaction product comprising sulfur-doped porous carbon,
wherein the crosslinked, pyrolyzed reaction product has a BET surface area ranging from about 750 $m^2$/g to about 3000 $m^2$/g, wherein a sulfur content of the crosslinked, pyrolyzed reaction product ranges from about 2 wt. % to about 10 wt. %; wherein at least a portion of the plurality of olefin moieties are crosslinked with the sulfur or a polymerized form thereof in the crosslinked, pyrolyzed reaction product and wherein the heavy hydrocarbon product comprises one or more trace metals that remain as a plurality of trace metal inclusions in the crosslinked, pyrolyzed reaction product.

7. The sulfur-doped porous carbon of claim 6, wherein an alkene is included with the heavy hydrocarbon product and the sulfur in the reaction mixture, wherein the alkene is a hydrocarbon compound having a molecular weight of about 300 or less.

8. A process comprising:
combining a heavy hydrocarbon product with sulfur to form a reaction mixture, wherein the heavy hydrocarbon product has boiling points from about 200° C. to about 600° C. and comprises one or more trace metals;
heating the reaction mixture to a first temperature state to form a liquefied reaction mixture comprising a reaction intermediate comprising a sulfur-crosslinked heavy hydrocarbon product;
homogenously mixing a hydroxide base with the liquefied reaction mixture; and
heating the liquefied reaction mixture and the hydroxide base to a second temperature state sufficient to pyrolyze the reaction intermediate in the liquefied reaction mixture to form a crosslinked, pyrolyzed reaction product comprising sulfur-doped porous carbon,
wherein the crosslinked, pyrolyzed reaction product has a BET surface area ranging from about 750 $m^2$/g to about 3000 $m^2$/g, wherein a sulfur content of the crosslinked, pyrolyzed reaction product ranges from about 2 wt. % to about 10 wt. %; wherein at least a portion of the plurality of olefin moieties are crosslinked with the sulfur or a polymerized form thereof in the crosslinked, pyrolyzed reaction product and wherein the heavy hydrocarbon product comprises one or more trace metals that remain as a plurality of trace metal inclusions in the crosslinked, pyrolyzed reaction product.

9. The process of claim 8, wherein the first temperature state comprises a temperature of about 200° C. or less.

10. The process of claim 8, wherein the second temperature state comprises a temperature of about 500° C. or higher.

11. The process of claim 8, wherein the second temperature state comprises a temperature of about 700° C. or higher.

12. The process of claim 8, wherein heating to the second temperature state is conducted under an inert atmosphere.

13. The process of claim 8, wherein the hydroxide base comprises one or more alkali metal hydroxides.

14. The process of claim 8, wherein a ratio of the heavy hydrocarbon product to the sulfur is at least about 1:1 or greater.

15. The process of claim 8, wherein the heavy hydrocarbon product is a refinery process stream selected from the group consisting of steam cracker tar, heavy coker gas oil, and any combination thereof.

* * * * *